United States Patent
Rocks

(10) Patent No.: US 6,777,031 B2
(45) Date of Patent: Aug. 17, 2004

(54) ADDITION-CROSSLINKING SILICONE RUBBER MIXTURES

(75) Inventor: Jens Rocks, Zürich (CH)

(73) Assignee: ABB Research LTD, Zurich (CH)

(*) Notice: Subject to any disclaimer, the term of this patent is extended or adjusted under 35 U.S.C. 154(b) by 0 days.

(21) Appl. No.: 10/156,082

(22) Filed: May 29, 2002

(65) Prior Publication Data

US 2002/0197491 A1 Dec. 26, 2002

Related U.S. Application Data

(63) Continuation of application No. PCT/CH00/00629, filed on Nov. 24, 2000.

(30) Foreign Application Priority Data

Nov. 29, 1999 (DE) .......................................... 199 57 276

(51) Int. Cl.[7] .............................. B05D 3/02; B05D 3/10; B32B 25/20
(52) U.S. Cl. ....................... 427/387; 427/299; 427/307; 427/327; 428/447; 428/448; 428/450
(58) Field of Search ................................. 427/299, 307, 427/327, 387; 428/447, 448, 450, 449; 528/15

(56) References Cited

U.S. PATENT DOCUMENTS

| | | | |
|---|---|---|---|
| 3,159,601 A | | 12/1964 | Ashby |
| 3,627,836 A | * | 12/1971 | Getson ........................ 525/100 |
| 4,087,585 A | | 5/1978 | Schulz |
| 4,322,320 A | * | 3/1982 | Caprino ....................... 523/212 |
| 4,707,193 A | * | 11/1987 | Portz et al. .................. 148/254 |
| 5,364,921 A | | 11/1994 | Gray et al. |
| 5,430,082 A | * | 7/1995 | Bentz .......................... 524/264 |
| 6,316,057 B1 | * | 11/2001 | Hirayama et al. .......... 427/400 |
| 6,376,568 B1 | * | 4/2002 | Baudin et al. .................. 522/6 |

FOREIGN PATENT DOCUMENTS

| | | |
|---|---|---|
| EP | 0057459 | 8/1982 |
| EP | 0169529 | 1/1986 |
| EP | 0183967 | 6/1986 |
| EP | 0326712 A2 | 8/1989 |
| EP | 0326712 B1 | 8/1989 |
| EP | 0503975 A2 | 9/1992 |
| EP | 0875536 | 11/1998 |
| GB | 1027051 | 4/1966 |
| WO | 01/40378 A1 | 6/2001 |

OTHER PUBLICATIONS

Casri et al. "Hydrosilylation Chemistry and Catalysiss with cis–PtC12(PhCH=CH2)2" Organometallics Jun. 1988, 7, p. 1373–1380.*

Database—CCAPLUS "Online"—Caseri, Walter, et al.: "Hydrosilylation chemistry and catalysis with cis–PtC12(PhCH:CH2)2", and Organometallics Bd. 7, No. 6 (1988), pp. 1373–1380.

M. Heidingsfeldova et al., "Rhodium Complexes as Catalysts for Hydrosilylation Crosslinking of Silicone Rubber", J. Appl. Polym. Sci., vol. 30, pp. 1837–1846 (1985).

* cited by examiner

Primary Examiner—Jeffrey B. Robertson
(74) Attorney, Agent, or Firm—Burns, Doane, Swecker & Mathis, L.L.P.

(57) ABSTRACT

Addition-crosslinking silicone rubber mixtures and a process for coating substrate surfaces and shaped composites with this mixture are disclosed. The addition-crosslinking silicone rubber mixture comprises at least the following constituents:
(a) a cyclic, linear or branched organopolysiloxane which contains on average at least two alkenyl groups per molecule and has a viscosity of from 0.01 to 30,000 Pas;
(b) a cyclic, linear or branched organohydrogenpolysiloxane which may contain dimethylsilyloxy groups and preferably has on average at least two SiH groups per molecule; and
(c) a catalytically effective amount of the compound cis-dichlorobis(styrene) platinum(II), which may have been dissolved in a suitable organic solvent,
where the molar ratio of the SiH groups present in the mixture to the Si-bonded alkenyl groups present in the mixture is at least 1.5, preferably from about 1.5 to 4.5 and more preferably from about 1.8 to about 2.5.

57 Claims, No Drawings

ADDITION-CROSSLINKING SILICONE RUBBER MIXTURES

This application is a continuation of International Application No. PCT/CH00/0629 filed on Nov. 24, 2000.

This application claims priority under 35 U.S.C. §§119 and/or 365 to Appln. No. 199 57 276.3 filed in Germany on Nov. 29, 1999; the entire content of which is hereby incorporated by reference.

FIELD OF THE INVENTION

The present invention relates to addition-crosslinking silicone rubber mixtures which display, in particular, very good adhesion to numerous substrates and a considerably increased reaction rate in the crosslinking process. Addition-crosslinking silicone rubber mixtures according to the invention are used, in particular, as coatings on substrates, for example on glass, ceramic, metals or plastics, or in the production of composites.

Liquid addition-crosslinking silicone rubber mixtures comprising (i) at least one organopolysiloxane containing alkenyl groups and (ii) at least one organohydrogenpolysiloxane are known per se. To accelerate the crosslinking addition reaction between the alkenyl group (—CH=CH$_2$) and the H—Si group, such a mixture generally further comprises, as catalyst, at least one known complex of a metal selected from the group consisting of rhodium, nickel, palladium and platinum, preferably complexes of platinum. However, it is also known that the cured solid silicone rubbers obtained from the abovementioned liquid to paste-like mixtures have unsatisfactory adhesion to substrates such as glass, ceramic, metal or plastic. Attempts have therefore been made to improve these adhesion properties by addition of additives so that silicone rubbers of this type can be used for producing coatings and composites.

BACKGROUND OF THE INVENTION

U.S. Pat. No. 4,087,585 proposes the addition of a short-chain polysiloxane containing at least one SiOH group and a silane containing at least one epoxide group and an Si-bonded alkoxy group to achieve satisfactory adhesion to aluminum. According to EP-A-0 326 712, improved adhesion to various plastics is achieved by means of a mixture or a reaction product of (a) a silicon-free compound containing at least one alcoholic OH group and at least one alkylene group and (b) an organosilane containing at least one alkoxy group and at least one epoxide group, but this requires relatively long reaction times (1 hour) at a temperature of 120° C. The long reaction times are frequently caused by the adhesion promoters which are simultaneously present and have an inhibiting action. According to EP-A-0 503 975, inhibition by such additives can be improved, but only to a limited extent, by selection of an optimized ratio of the unsaturated CH$_2$=CH—Si— groups to the SiH groups. Improved adhesion to aluminum is, for example, achieved only after a relatively long vulcanization time of 2 hours at 100° C. Possible shortening of the reaction times by increasing the temperature is not possible in the case of, in particular, many polymer substrates because of their lack of heat resistance.

EP-A-0 875 536 proposes the combination of organopolysiloxanes containing alkenyl groups with selected silanes and at least one alkoxysilane containing at least one epoxide group and/or an alkoxysilane containing at least one epoxide group.

SUMMARY OF THE INVENTION

Accordingly, one object of the invention is to provide novel addition-crosslinking silicone rubber mixtures which display good adhesion to substrates and do not have the disadvantages of the prior art, e.g. low reactivity or a multiplicity of additives.

It has now been found that addition-crosslinking silicone rubber mixtures, preferably as liquid to paste-like mixtures, comprising at least one organopolysiloxane containing alkenyl groups and at least one organohydrogenpolysiloxane which may contain dimethylsilyloxy groups and, as catalyst, cis-dichlorobis(styrene)platinum(II), if desired in admixture with further customary catalysts, without additives, give a high reactivity and a cured product having very good adhesion properties. The addition-crosslinking silicone rubber mixtures of the invention can further comprise the customary additional constituents known per se. The preparation of cis-dichlorobis (styrene)platinum(II) is known per se and is described, for example, in W. R. Caseri, thesis, ETH Zurich, 1988. It is surprising that cis-dichlorobis (styrene)platinum(II) as selected platinum catalyst not only promotes the addition reaction but also considerably improves, compared to other catalysts known per se, the adhesion properties of the cured product. A composition comprising the components (a), (b) and (c) and optionally (d) defined below, where the molar ratio of the SiH groups present in the mixture to the Si-bonded alkenyl groups present in the mixture is at least 1.5, preferably from about 1.5 to 4.5 and more preferably from about 1.8 to about 2.5, has not previously been described in connection with the excellent adhesion properties associated therewith. Particularly good results are obtained when the surface to be coated is treated prior to the coating procedure with a degreasing agent which has a slightly corrosive action, as is described below for the process for the use of the silicone rubber mixture of the invention.

DETAILED DESCRIPTION OF THE INVENTION

The present invention is formulated in the claims. The present invention provides an addition-crosslinking silicone rubber mixture, preferably liquid to paste-like form, which comprises at least the following constituents:

(a) a cyclic, linear or branched organopolysiloxane which contains on average at least two alkenyl groups per molecule and has a viscosity of from 0.01 to 30,000 Pas;

(b) a cyclic, linear or branched organohydrogenpolysiloxane which may contain dialkylsilyloxy groups and preferably has on average at least two SiH groups per molecule; and (c) a catalytically effective amount of the compound cis-dichlorobis (styrene)platinum(II), which may have been dissolved in a suitable organic solvent, where the molar ratio of the SiH groups present in the mixture to the Si-bonded alkenyl groups present in the mixture is at least 1.5, preferably from about 1.5 to 4.5 and more preferably from about 1.8 to about 2.5.

The compound cis-dichlorobis(styrene)platinum(II), which according to the invention acts simultaneously as catalyst and adhesion promoter, is preferably present in amounts of from 1 ppm to 5000 ppm, preferably from 50 ppm to 200 ppm, calculated as the weight of platinum in the platinum compound per unit weight of all polysiloxane compounds present or based on the total weight of the components (a) and (b). Suitable solvents for the component (c) are, for example, toluene, petroleum ether and comparable compounds.

The addition-crosslinking silicone rubber mixture of the invention can, if desired, further comprise other customary constituents known per se, in particular (d) at least one complex of a metal selected from the group consisting of rhodium, nickel, palladium and platinum, for example complexes which are known as catalytically active compounds for addition reactions between SiH bonds and alkenyl radicals. These additional catalysts can have a positive effect on the reaction rate of the addition reaction. However, only the presence of cis-dichlorobis(styrene)platinum(II) in the abovementioned amounts is essential to achieve the excellent adhesion properties obtained according to the invention.

The mixture of the invention can, if desired, further comprise other customary constituents known per se, e.g. (e) at least one filler which may have been surface-modified or a mixture of such fillers, with this filler or the mixture of fillers preferably being present in an amount of from 5 to 200 parts by weight per 100 parts by weight of the component (a);
(f) at least one inhibitor or a mixture of inhibitors for stabilizing the mixture comprising the components (a) and (b);
(g) further auxiliaries, preferably phenyl silicone oils, preferably in an amount of up to 10 parts by weight, more preferably from 0.05 to 10 parts by weight, per 100 parts by weight of the component (a), to obtain self-lubricating mixtures and/or (h) colorant pastes, preferably silicone oils containing from 10 to 70% by weight of pigments, in an amount of up to 10 parts by weight per 100 parts by weight of the component (a).

The present invention further provides for the use of the addition-crosslinking silicone rubber mixtures of the invention for producing coatings and shaped composites.

The present invention further provides coated shaped parts and shaped composites which have been produced using the addition-crosslinking silicone rubber mixtures of the invention.

The present invention also provides a process for producing coatings and shaped composites using the addition-crosslinking silicone rubber mixtures of the invention, as is described below, and the coated parts and shaped composites produced in this way.

The present invention further provides addition-crosslinking silicone rubber mixtures according to the invention which are in the form of multicomponent systems, preferably two-component systems.

The silicone rubber mixture of the invention preferably comprises at least one filler which may have been surface-modified or a mixture of such fillers [component (e)]. In this respect, the present invention also provides a process for producing such addition-crosslinking silicone rubber mixtures, as is described below.

For the purposes of the present invention, the term "organopolysiloxane containing on average at least two alkenyl groups per molecule of the component (a)" encompasses all appropriate; known polysiloxanes which have hitherto been used in crosslinkable organopolysiloxane compositions. The organopolysioxanes of the component
(a) are preferably compounds or mixtures of compounds of the formula (I):

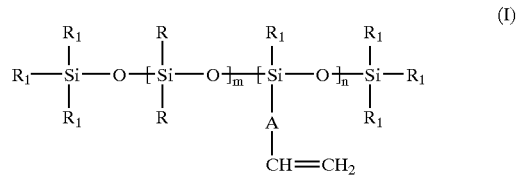

where
R are each, independently of one another, an alkyl radical having from 1 to 8 carbon atoms or phenyl, preferably alkyl having 1–4 carbon atoms, more preferably methyl;
$R_1$ each have, independently of one another, one of the meanings of R or can be a radical —A—CH=CH$_2$;
A is a radical —($C_sH_{2s}$)$_p$—, preferably —[(CH$_2$)$_s$]$_p$—, where
s is an integer from 1 to 6, preferably l;
p is zero or one;
m is on average from zero to 5000, preferably from 20 to 5000, more preferably from 50 to 1500;
n is on average from zero to 100, preferably from 2 to 100, more preferably from 2 to 20,
where the compound or the mixture of compounds has on average at least two radicals —A—CH=CH$_2$ per molecule and the groups —[Si(R)(R)O]— and —[Si(R$_1$)(A—CH=CH$_2$)O]— are present in any order in the molecule.

p is preferably zero, so that there is no radical A or the radical —A—CH=CH$_2$ is vinyl. Preference is given to the two terminal silyloxy groups being, independently of one another, dimethylvinylsiloxy, in which case n is preferably zero. In a preferred embodiment, the organopolysiloxanes of the component (a) have viscosities in the range from 0.01 to 500 Pas, in particular in the range from 1 to 100 Pas. The viscosities indicated are determined at 20° C. in accordance with DIN 53 019. The sum of m+n is preferably on average in the range from 20 to 5000, preferably from 50 to 1500.

The compound of the formula (I) is generally a mixture of compounds of the formula (I), as a person skilled in the art will know. In this sense, molecules having more than 100 [Si(R$_1$)(A—CH=CH$_2$)O] groups per molecule can also be present in such a mixture.

The component (b) comprises at least one cyclic, linear or branched organohydrogenpolysiloxane which preferably has on average at least two SiH groups per molecule. The organohydrogenpolysiloxane of the component (b) preferably corresponds to a compound or a mixture of compounds of the formula (II):

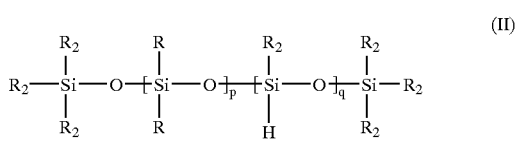

where
R are each, independently of one another, an alkyl radical having from 1 to 8 carbon atoms or phenyl, preferably alkyl having 1–4 carbon atoms, more preferably methyl;

$R_2$ each have, independently of one another, one of the meanings of R or can be hydrogen;

p is on average from zero to 5000, preferably from 20 to 5000, more preferably from 50 to 1500;

q is on average from zero to 60, preferably from 2 to 60, more preferably from 2 to 30, where the compound or the mixture of compounds has on average at least two —SiH groups per molecule and the groups —[Si(R)(R)O]— and —[SiH($R_2$)]— are present in any order in the molecule.

Preference is given to the two terminal silyloxy groups being, independently of one another, dimethylhydrogensiloxy, in which case q can be zero. The compound of the formula (II) is generally a mixture of compounds of the formula (II), as a person skilled in the art will know. In this sense, molecules having more than 60 —SiH($R_2$) groups per molecule can also be present in such a mixture. The compound of the formula (II), or the corresponding mixture, preferably has a viscosity in the range from 0.01 to 5 Pas. If the component (b) is or comprises a cyclic organohydrogenpolysiloxane, this is composed of —[Si(R)(R)O]— and —[SiH($R_2$)]— units or of only —[SiH ($R_2$)]— units, which form a ring. Such a ring preferably contains from 4 to 8 such units, more preferably 4 such units and preferably has the formula [—SiH($R_2$)—]$_4$.

The molar ratio of the SiH groups present in the compound of the component (b) to the Si-bonded alkenyl groups present in the compound of the component (a) is, according to the invention, at least 1.5, preferably from about 1.5 to 4.5 and more preferably from about 1.8 to about 2.5. To a person skilled in the art, the choice of the components and the determination of the ratios is a question of optimization.

Depending on the way in which they are prepared, the branched polysiloxanes in particular of the components (a) and (b) may contain up to 10 mol percent of alkoxy groups and of OH groups, calculated on the basis of the Si atoms present. Such compounds come within the scope of the present invention. The same applies to the silicone polymers described below which can be mixed in the form of solutions of solid resins dissolved in solvents having a proportion of solid resin which is preferably in the range from 10 to 80% by weight into the mixture of the invention.

The component (d) which is optionally present comprises one or more complexes of metals selected from the group consisting of rhodium, nickel, palladium and platinum, for example complexes known as catalytically active compounds for addition reactions between SiH bonds and alkenyl radicals. Preference is given to Pt(0) complexes with alkenylsiloxanes as ligands in catalytic amounts of preferably from 1 to 100 ppm of platinum. The Rh compounds described in J. Appl. Polym. Sci 30, 1837–1846 (1985) can likewise be used. The amount of Rh catalyst is likewise preferably from 1 to 100 ppm.

Fillers (e) used for the purposes of the invention are preferably reinforcing fillers known per se, e.g. pyrogenic or precipitated silica having a BET surface area of from 50 to 400 $m^2/g$, and/or extender fillers such as quartz flour, diatomaceous earths. These can have been surface-modified in a manner known per se. These fillers are preferably used in amounts of from 10 to 50 parts by weight per 100 parts by weight of the component (a).

The surface treatment of the fillers can also be carried out in situ in a manner known per se by addition of silazanes, e.g. hexamethylsilazane and/or divinyltetramethyldisilazane, or vinylalkoxysilanes, e.g. vinyltrimethoxysilane, and water or other customary filler treatment agents, e.g. alkoxysilanes or siloxanediols.

Inhibitors of the component (f) for stabilizing the mixture of the invention are known per se. Examples of such inhibitors are alkylols such as 2-methylbutynol(2) or 1-ethynylcyclohexanol in amounts of from 50 to 10,000 ppm.

In a further embodiment of the invention, the mixture further comprises additional auxiliaries (g), e.g. phenylsilicones, in particular phenylsilicone oils, which give self-lubricating vulcanizates, preferably in an amount of from 0.05 to 5 parts by weight per 100 parts by weight of the component (a). Examples of such phenylsilicones are copolymers comprising dimethylsiloxy and diphenylsiloxy and/or methylphenylsiloxy groups and also polysiloxanes comprising methylphenylsiloxy groups, preferably having a viscosity of 0.1–10 Pas.

The mixtures of the invention may further comprise colorant pastes (h), e.g. silicone oils containing from 10 to 70% by weight of pigments, in an amount of from 0.05 to 10 parts by weight, preferably from 0.05 to 5 parts by weight, based on 100 parts by weight of the component (a). Such colorant pastes are known per se.

The silicone rubber mixture of the invention preferably comprises at least one filler, which may be surface-modified, or a mixture of such fillers [component (e)]. In this context, the present invention also provides a process for preparing the addition-crosslinking silicone rubber mixture of the invention, characterized in that at least one organopolysiloxane of the component (a) is intimately mixed with at least one surface-modified or unmodified, preferably hydrophobicized, filler of the component (e) and subsequently adding organohydrogenpolysiloxane of the component (b), the catalyst of the component (c) and, if desired, further organopolysiloxane of the component (a) and further additives of the components (d) and (e) to (h) to the mixture obtained in this way. Mixing is preferably carried out using mixers suitable for highly viscous materials, e.g. in a kneader, high-speed mixer or planetary mixer.

In a preferred embodiment of the process of the invention, the filler (e) is hydrophobicized, with the hydrophobicization preferably being carried out in situ.

In the in-situ hydrophobicization, preference is given to stirring the organopolysiloxane of the component (a), the filler (e) and the hydrophobicizing agent, preferably hexamethyldisilazane and/or divinyltetramethyldisilazane, preferably at temperatures of 90–100° C., for at least 20 minutes in a mixer suitable for highly viscous materials, e.g. in a kneader, high-speed mixer or planetary mixer, and subsequently freeing the mixture of excess treatment agent and water at a temperature of about 150–160° C., initially at atmospheric pressure and then at a pressure of from 100 to 20 mbar. The further components, i.e. the organohydrogenpolysiloxane of the component (b) and the catalyst (c), and, if desired, further organopolysiloxanes of the component (a), the catalyst (d), the inhibitor (f), the auxiliary (g) and/or the colorant paste (h) are subsequently mixed in over a period of from 10 to 30 minutes. The mixture is then applied to the desired substrate and crosslinked.

The present invention further provides the addition-crosslinking silicone rubber mixture of the invention in the form of a two-component system, where the one (first) component comprises at least one organopolysiloxane (a), the catalyst (c) and, if desired, the catalyst (d) and also, if desired, the filler (e) and/or auxiliary (g), and the other (second) component comprises at least one organopolysiloxane (a), at least one organohydrogenpolysiloxane of the component (b) and, if desired, the filler (e), the inhibitor (f), the auxiliary (g) and the colorant paste (h).

It is also possible to divide up the individual components into multicomponent systems, for example a three-component system. The division of the individual amounts into the individual components of the multicomponent system depends, in particular, on the stability of the individual components. In this sense, the division is a question of optimization and poses no problems for a person skilled in the art. When using a multicomponent system of the invention, the components are combined and mixed only shortly before use, preferably in an injection molding machine or in an upstream mixing head having a subsequent static mixer. All customary injection molding machines can be used for the process of the invention.

Substrate surfaces to be coated are normally carefully cleaned with surface-active agents to remove any contamination, for example grease or fats, prior to coating or processing to produce shaped composites. It has surprisingly been found that adhesion of the silicone rubber mixture of the invention to the substrate surface undergoes a step improvement when the surface is treated with a surface-active agent having a corrosive action prior to coating with the addition-crosslinking silicone rubber mixture of the invention.

Accordingly, the present invention provides a process for coating substrate surfaces and for producing shaped composites, characterized in that the substrate surfaces are treated with a surface-active agent or composition having a corrosive action prior to coating and subsequently coating them with the addition-crosslinking silicone rubber mixture of the invention or subsequently placing together the substrates and/or substrate combinations and introducing the addition-crosslinking silicone rubber mixture of the invention into the intermediate spaces, and curing or vulcanzing the silicone rubber mixture at elevated temperature.

The substrate surfaces preferably comprise metal, glass, ceramic and/or plastic. Preferred metals are aluminum, aluminum alloys, e.g. AlMgSi alloys known per se, chromium-nickel steel or brass.

The treatment with a surface-active composition or agent having a corrosive action is preferably carried out using an aqueous degreasing agent which has a corrosive action and is suitable for the treatment of copper alloys, chromium steel, glass or ceramic. This preferably has only a slightly corrosive action and is acidic or basic. It is preferably an acidic surface-active composition. The acidity of this agent (as aqueous concentrate) is preferably in the acid pH range at a pH of from about 5.0 to 6.5, more preferably from about 5.5 to 6.2. For treatment of the substrate surfaces, this concentrate is mixed with water in such an amount that the acidity (pH) of the treatment solution is from about 5.5 to 6.8, preferably from about 6.0 to 6.6, and the treatment is carried out by dipping, preferably aided by ultrasound. Here, the working temperature is about 50–60° C. and the treatment time is about 0.5–10 minutes, preferably about 2–6 minutes.

The agent can comprise a plurality of components, so that the surfactant action and the corrosive action may be attributable to different components or compounds. In this context, the agent particularly preferably comprises (i) at least one surface-active compound (surfactant) known per se or a mixture of such surface-active compounds and (ii) at least one water-soluble inorganic or organic acid or a corresponding acidic salt, or a combination of such acids and/or salts, in each case in a concentration which results in an acidity of the aqueous solution which is in the above-mentioned range.

As surface-active compound (surfactant), it is in principle possible to use all surface-active compounds (surfactants) known per se which can be used in cleaning compositions. The surface-active compound can be ionic or nonionic and should be chemically stable under the treatment conditions, i.e. at slightly elevated temperature and at slightly acidic pH values. Preference is given to, for example, fatty acids and fatty alcohols each preferably having from 6 to 22 carbon atoms and their derivatives, e.g. alkoxylated fatty acids or fatty alcohols, preferably ethoxylated fatty alcohols.

Possible inorganic acids and salts are, in particular, fluorides or sulfates, preferably fluorides such as sodium fluoride, potassium fluoride and/or ammonium fluoride. The agent can, if desired, contain small amounts of one or more inorganic acids, for example a little sulfuric acid or hydrofluoric acid, so that the acidity of the agent as aqueous concentrate is in the pH range from about 5.0 to 6.5.

Possible organic acids are, preferably, saturated or unsaturated organic aliphatic acids, in particular polybasic acids, i.e. acids having a plurality of carboxyl groups per molecule, e.g. malic acid, citric acid, tartaric acid, succinic acid, oxalosuccinic acid and related acids, and also aromatic carboxylic acids, e.g. benzoic acid, phthalic acid and related acids, preferably benzoic acid. It is likewise possible to use hydroxyl-containing acids such as gluconic acid and related acids, preferably in combination with one of the abovementioned organic acids.

Preference is given to a composition comprising an ethoxylated fatty alcohol or a mixture of ethoxylated fatty alcohols as surface-active component and an organic acid, preferably benzoic acid, malic acid, citric acid or tartaric acid, preferably a combination of benzoic acid and citric acid, and optionally gluconic acid, as component having a corrosive action. The mixture can be in the form of a stock concentrate and be diluted to the appropriate concentration for each particular application. Such a stock concentrate can have a solids content of from 10 to 15% and be diluted so that the pH of the treatment solution is in the desired range. Optimization of the individual components presents no problems to a person skilled in the art.

A suitable surface-active agent or cleaner and degreasing agent comprising benzoic acid, citric acid and gluconic acid for carrying out the present invention is, for example, commercially available from PRELIT AG, Chemische Werke, CH-5608 Stetten/Switzerland, under the name PRELIT™ LP156.

In the following examples, all parts are by weight. The examples illustrate the invention without restricting it.

The adhesion of the cured silicone rubber mixtures to various substrates was tested by a method based on DIN 53 289 (climbing drum peel test) at a test speed of 100 mm/min using in each case two test specimens.

applied to the various substrates. Curing or vulcanization was carried out at 180° C. for 1 hour.

In the experiments in which no cis-dichlorobis (styrene) platinum(II) is present (comparative experiments), the customary catalysts are present.

TABLE 1

| Exp. No. | Base Component* [% by weight] | Additive** [% by weight] | Additive*** [% by weight] | Catalyst**** [% by weight] | Substrate | Bond strength [N/mm] |
|---|---|---|---|---|---|---|
| 1 | 100 | 3 | — | 5 | AlMgSil (Al mechanical alloy) | 4–5-C |
| 2 | 100 | — | 0.3 | 3 | AlMgSil (Al mechanical alloy) | 3–4-C |
| 3 | 100 | — | — | — | AlMgSil (Al mechanical alloy) | <0.5-A |
| 4 | 100 | 3 | — | 5 | Glass plate (window glass) | 4–5-C |
| 5 | 100 | — | 0.3 | 3 | Glass plate (window glass) | 4–5-C |
| 6 | 100 | — | — | — | Glass plate (window glass) | <0.5-A |
| 7 | 100 | 3 | — | 5 | Brass | 4–5-C |
| 8 | 100 | — | 0.3 | 3 | Brass | 3–4-C |
| 9 | 100 | — | — | — | Brass | <0.5-A |
| 10 | 100 | 3 | — | 5 | Steel St-37 | 4–5-C |
| 11 | 100 | — | 0.3 | 3 | Steel St-37 | 2–3-M |
| 12 | 100 | — | — | — | Steel St-37 | <0.5-A |
| 13 | 100 | 3 | — | 5 | Chromium-nickel steel 18-8 | 4–5-C |
| 14 | 100 | — | 0.3 | 3 | Chromium-nickel steel 18-8 | 3–4-C |
| 15 | 100 | — | — | — | Chromium-nickel steel 18-8 | <0.3-A |
| 16 | 100 | 3 | — | 5 | Glass-reinforced epoxy resin | 4–5-C |
| 17 | 100 | — | 0.3 | 3 | Glass-reinforced epoxy resin | 4–5-C |
| 18 | 100 | — | — | — | Glass-reinforced epoxy resin | <0.5-A |
| 19 | 100 | 3 | — | 5 | Polyimide (Capton ®) | 4–5-C |
| 20 | 100 | — | — | — | Polyimide (Capton ®) | <0.5-A |

*(Base component) addition-crosslinking two-component liquid silicone rubber Silopren LSR 2530, from GE-Bayer Silicones GmbH & Co. KG, Germany, viscosity: 60 Pas, mixing ratio of the components (a) and (b) = 1, SiH:Si-vinyl ratio = 1.8
**Methylhydrosiloxane-dimethylsiloxane copolymer HMS-301 from ABCR GmbH & Co. KG, Germany, molecular weight = 1900–2000, ($CH_3HSiO$) content = 25–30 mol %.
***Methylhydrosiloxane, Baysilone oil MH15 from GE-Bayer Silicones GmbH & Co. KG, Germany, viscosity: about 15 cSt (at 25° C.), about 40 [SiH(O)($CH_3$)] units per molecule, with terminal [Si ($CH_2$)$_3$] units.
****0.5% strength by weight solution of cis-dichlorobis(styrene)platinum(II) in toluene. The parts by weight in Table 1 are based on the dry weight of platinum.
C = Cohesive failure
A = Adhesive failure
M = Mixed-mode failure

EXAMPLE 1

The mixtures indicated in Table 1 (Example 1) were vulcanized onto the various substrates and the bond strengths were determined.
a) The substrates to be coated were treated for 5 minutes in a cleaning bath comprising deionized water containing 5% by weight of the cleaning agent PRELITIN™ LP 156 from PRELIT AG, Chemische Werke, CH-5608 Stetten/ Switzerland at 60° C., treated at pH 6.3±0.3 for 3 minutes and subsequently dried at 80° C. in a drying oven for 10 minutes.
b) The individual components of the silicone rubber mixtures were mixed by means of a dynamic mixer at 300 rpm for 5 minutes. The mixture was subsequently evacuated at pressures of <40 mbar for 5 minutes, after which a layer was

EXAMPLE 2

In Table 2 (Example 2), an adhesive bond is produced from an addition-crosslinking silicone rubber according to the invention.

a) The substrates are pretreated as described in Example 1, paragraph a).

b) The addition-crosslinking silicone rubber is prepared by a method analogous to Example 1, paragraph b) or according to the composition indicated in Table 2 and used for producing a component or for adhesively bonding the respective substrates. The tensile shear strengths were determined in accordance with DIN EN 1465.

TABLE 2

| Exp. No. | Base component* [% by weight] | Additive** [% by weight] | Catalyst*** [% by weight] | Substrate combination | Tensile shear strength [MPa] |
|---|---|---|---|---|---|
| 1 | 100 | 3 | 5 | AlMgSil (Al mechanical alloy) bonded to AlMgSil (Al mechanical alloy.) | 2.6-C |
| 2 | 100 | — | — | AlMgSil (Al mechanical alloy) bonded to AlMgSil (mechanical alloy) | <0.2-A |
| 3 | 100 | 3 | 5 | AlMgSil (Al mechanical alloy) bonded to glass-reinforced epoxy resin | 2.8-C |
| 4 | 100 | — | — | AlMgSil (Al mechanical alloy) bonded to glass-reinforced epoxy resin | <0.2-A |
| 5 | 100 | 3 | 5 | Glass-reinforced epoxy resin bonded to glass-reinforced epoxy resin | 2.1-C |
| 6 | 100 | — | — | Glass-reinforced epoxy resin bonded to glass-reinforced epoxy resin | <0.2-A |
| 7 | 100 | 3 | 5 | Glass bonded to glass | 2.4-C |
| 8 | 100 | — | — | Glass bonded to glass | <0.2-A |

*(Base component), the same as in Example 1
**Methylhydrosiloxane-dimethylsiloxane copolymer, the same compound as in Example 1
****0.5% strength by weight solution of cis-dichlorobis(styrene)platinum(II) in toluene. The parts by weight in Table 1 are based on the dry weight of platinum.
C = Cohesive failure
A = Adhesive failure
M = Mixed-mode failure Obviously, numerous modifications and variations of the present invention are possible in the light of the above teachings. It is therefore to be understood that within the scope of the appended claims, the invention may be practiced otherwise than as specifically described herein.

What is claimed is:

1. A process for coating substrate surfaces and for producing shaped composites, in which the substrate surfaces are coated with an addition-crosslinking silicone rubber mixture or the substrates are placed together and the addition-crosslinking silicone rubber mixture is introduced into intermediate spaces and subsequently cured at elevated temperature, wherein
   (i) prior to coating, the substrate surfaces are treated with a surface-active composition having a corrosive action, and
   (ii) subsequently, the dry substrate surfaces are coated with a silicone rubber mixture in liquid or paste-like form that comprises at least the following constituents:
   (a) a cyclic, linear or branched organopolysioxane which contains on average at least two alkenyl groups per molecule and has a viscosity of from 0.01 to 30,000 Pas;
   (b) a cyclic, linear or branched organohydrogenpolysioxane which contains dialkylsilyloxy groups and a SiH group; and
   (c) a catalytically effective amount of cis-dichlorobis(styrene)platinum(II), which has been dissolved in a suitable organic solvent, where a molar ratio of SiH groups present in the addition-crosslinking silicone rubber mixture to Si-bonded alkenyl groups present in the addition-crosslinking silicone rubber mixture is at least 1.5.

2. The process as claimed in claim 1, wherein the silicone rubber mixture contains from 1 ppm to 5000 ppm, cis-dichlorobis(styrene)platinum(II), calculated as weight of platinum in cis-dichlorobis(styrene)platinum(II) divided by total weight of component (a) and (b).

3. The process as claimed in claim 1, wherein the silicone rubber mixture further comprises one or more of the following:
   (d) at least one complex of a metal selected from the group consisting of rhodium, nickel, palladium, platinum and complexes which are used as catalytically active compounds for addition reactions between SiH bonds and alkenyl radicals:
   (e) at least one filler which has been surface-modified or a mixture of such fillers, with this filler or the mixture of fillers present in an amount of from 5 to 200 parts by weight per 100 parts by weight of component (a);
   (f) at least one inhibitor or a mixture of inhibitors for stabilizing the silicone rubber mixture comprising components (a) and (b);
   (g) phenylsilicone oils in an amount of up to 10 parts by weight per 100 parts by weight of component (a); and
   (h) colorant pastes in an amount of up to 10 parts by weight per 100 parts by weight of component (a).

4. The process as claimed in claim 1, wherein the organopolysioxane of component (a) is a compound or a mixture of compounds according to formula (I):

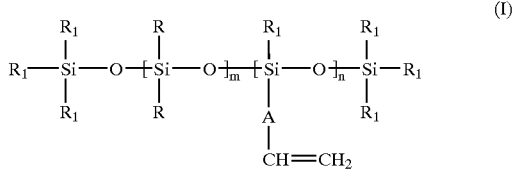

where
R are each, independently of one another, an alkyl radical having from 1 to 8 carbon atoms or a phenyl;
$R_1$ each have, independently of one another, one of the meanings of R or can be a radical —A—CH=CH$_2$;
A is a radical —(C$_s$H$_{2s}$)$_p$—, where
s is an integer from 1 to 6;
p is zero or one;
m is on average from zero to 5000;
n is on average from zero to 100,
where the compound or the mixture of compounds has on average at least two radicals —A—CH=CH$_2$ per molecule and the groups —[Si(R)(R)O]— and —[Si(R$_1$)(A—CH=CH$_2$)O]— are present in any order in the molecule.

5. The process as claimed in claim 4, wherein p=zero or the radical —A—CH=CH$_2$ is vinyl.

6. The process as claimed in claim 4, wherein the two terminal silyloxy groups in the compound or mixture of compounds of the formula (I) are, independently of one another, dimethylvinylsiloxy and the compound or the mixture of compounds of the formula (I) has a viscosity in the range from 0.01 to 500 Pas.

7. The process as claimed in claim 1, wherein the organohydrogenpolysiloxane of the component (b) is a compound or a mixture of compounds according to formula (II):

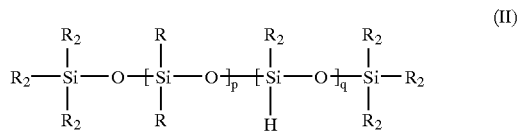

where
R are each, independently of one another, an alkyl radical having from 1 to 8 carbon atoms or phenyl;
$R_2$ each have, independently of one another, one of the meanings of R or can be hydrogen;
p is on average from zero to 5000;
q is on average from zero to 60,
where the compound or the mixture of compounds has on average at least two —SiH groups per molecule and the groups —[Si(R)(R)O]— and [—SiH(R$_2$)]— are present in any order in the molecule.

8. The process as claimed in claim 7, wherein the two terminal silyloxy groups in the compound or mixture of compounds of the formula (II) are, independently of one another, dimethylhydrogensiloxy and the compound of the formula (II) or the corresponding mixture has a viscosity in the range from 0.01 to 5 Pas.

9. The process as claimed in claim 1, wherein the component (b) is a cyclic organohydrogenpolysioxane which is composed of —[Si(R)(R)O]— and —[SiH(R$_2$)]— units or only of —[SiH(R$_2$)] units and contains from 4 to 8 such units.

10. The process as claimed in claim 1, wherein the silicone rubber mixture comprises at least one filler which has been surface-modified, and/or an extender filler.

11. The process as claimed in claim 1, wherein the substrate surfaces comprise metal, glass, ceramic and/or plastic.

12. The process as claimed in claim 1, wherein the surface active composition is an aqueous treatment solution comprising an agent having the corrosive action and has an acidity (pH) of from about 5.5 to 6.8, and treating the substrate surfaces is carried out by dipping, at a working temperature of about 50–600° C.

13. The process as claimed in claim 1, wherein the surface-active composition having a corrosive action comprises (i) at least one surface-active compound or a mixture of such surface-active compounds and (ii) at least one water-soluble inorganic or organic acid or a corresponding acidic salt or a combination of such acids and/or salts.

14. The process as claimed in claim 13, wherein the surface-active compound is chemically stable at slightly elevated temperature and at slightly acidic pH values.

15. The process as claimed in claim 13, wherein the inorganic acid and/or the inorganic salt is a fluoride or sulfate, and the surface-active composition contains an amount of one or more inorganic acids so that an acidity is in a pH range of from about 5.0 to 6.5.

16. The process as claimed in claim 13, wherein the organic acid is a saturated or unsaturated aliphatic acid containing hydroxyl groups, or an aromatic carboxylic acid.

17. The process as claimed in claim 13, wherein the surface-active composition comprises an ethoxylated fatty alcohol or a mixture of ethoxylated fatty alcohols and an organic acid.

18. The process for preparing a silicone rubber mixture as claimed in claim 3, wherein at least one organopolysiloxane of component (a) is intimately mixed with at least one surface-modified or unmodified filler of component (e), organohydrogenpolysiloxane of component (b), the catalyst of component (c) and, optionally, organopolysiloxane of component (a) and components (d) and (e) to (h) are subsequently added to the mixture obtained in this way.

19. The coated shaped part or a shaped composite which has been produced using the process as claimed in claim 1.

20. The process as claimed in claim 1, wherein the organohydrogenpolysioxane has on average at least two SiH groups per molecule.

21. The process as claimed in claim 1, wherein the molar ratio is from about 1.5 to 4.5.

22. The process as claimed in claim 21, wherein the molar ratio is from about 1.8 to about 2.5.

23. The process as claimed in claim 2, wherein the silicone rubber mixture contains from from 50 ppm to 200 ppm of cis-dichlorobis(styrene)platinum(II).

24. The process as claimed in claim 3, wherein phenyl-siliconce oils are present from 0.05 to 10 parts by weight.

25. The process as claimed in claim 3, wherein the colorant pastes are silicone oils containing from 10 to 70% by weight of pigments.

26. The process as claimed in claim 4, wherein the alkyl radical is an alkyl having 1–4 carbon atoms.

27. The process as claimed in claim 26, wherein the alkyl radical is methyl.

28. The process as claimed in claim 4, wherein A is —[(CH$_2$)$_s$]$_p$—.

29. The process as claimed in claim 4, wherein s is one.

30. The process as claimed in claim 4, wherein m is from 20 to 5000.

31. The process as claimed in claim 30, wherein m is from 50 to 1500.

32. The process as claimed in claim 4, wherein n is from 2 to 100.

33. The process as claimed in claim 32, wherein n is from 2 to 20.

34. The process as claimed in claim 6, wherein the viscosity is in the range from 1 to 100 Pas.

35. The process as claimed in claim 7, wherein the alkyl radical is an alkyl having 1–4 carbon atoms.

36. The process as claimed in claim 35, wherein the alkyl radical is methyl.

37. The process as claimed in claim 7, wherein P is from 20 to 5000.

38. The process as claimed in claim 37, wherein P is from 50 to 1500.

39. The process as claimed in claim 7, wherein q is from 2 to 60.

40. The process as claimed in claim 39, wherein q is from 2 to 30.

41. The process as claimed in claim 9, wherein the cyclic organohydrogenpolysioxane has 4 such units.

42. The process as claimed in claim 9, wherein the cyclic organohydrogenpolysioxane has the formula [—SiH(R$_2$)—]$_4$.

43. The process as claimed in claim 10, wherein the surface modified filler is pyrogenic or precipitated silica having a BET surface area of from 50 to 400 m$^2$/g.

44. The process as claimed in claim 10, wherein the extended filler is quartz flour and/or diatomaceous earth.

45. The process as claimed in claim 11, wherein the substrate surfaces comprise metal, glass and/or ceramic.

46. The process as claimed in claim 45, wherein the metal is aluminum, an aluminum alloy, chromium-nickel steel, or brass.

47. The process as claimed in claim 12, wherein the acidity (pH) is from about 6.0 to 6.6.

48. The process as claimed in claim 12, wherein dipping is aided by ultrasound.

49. The process as claimed in claim 14, wherein the surface-active compound is a fatty acid, a fatty alcohol or a derivative thereof.

50. The process as claimed in claim 49, wherein the surface-active compound is an alkoxylated fatty acid or an alkoxylated fatty alcohol.

51. The process as claimed in claim 50, wherein the surface-active compound is an ethoxylated fatty alcohol.

52. The process as claimed in claim 15, wherein the inorganic acid and/or the inorganic salt is a fluoride.

53. The process as claimed in claim 52, wherein the inorganic acid and/or the inorganic salt is sodium fluoride, potassium fluoride and/or ammonium fluoride.

54. The process as claimed in claim 16, wherein the saturated or unsaturated aliphatic acid is a polybasic acid.

55. The process as claimed in claim 16, wherein the aromatic acid is malic acid, citric acid, tartaric acid, succinic acid, oxalosuccinic acid, gluconic acid, benzoic acid, phthalic acid or a related acid.

56. The process as claimed in claim 17, wherein the organic acid is benzoic acid, malic acid, citric acid, tartaric acid, or a combination of benzoic acid and citric acid, and optionally, gluconic acid.

57. The process as claimed in claim 18, wherein component (e) is hydrophobicized.

* * * * *